Feb. 27, 1934.   A. B. MERRILL   1,949,063
ARTIFICIAL TURF
Filed Aug. 14, 1930
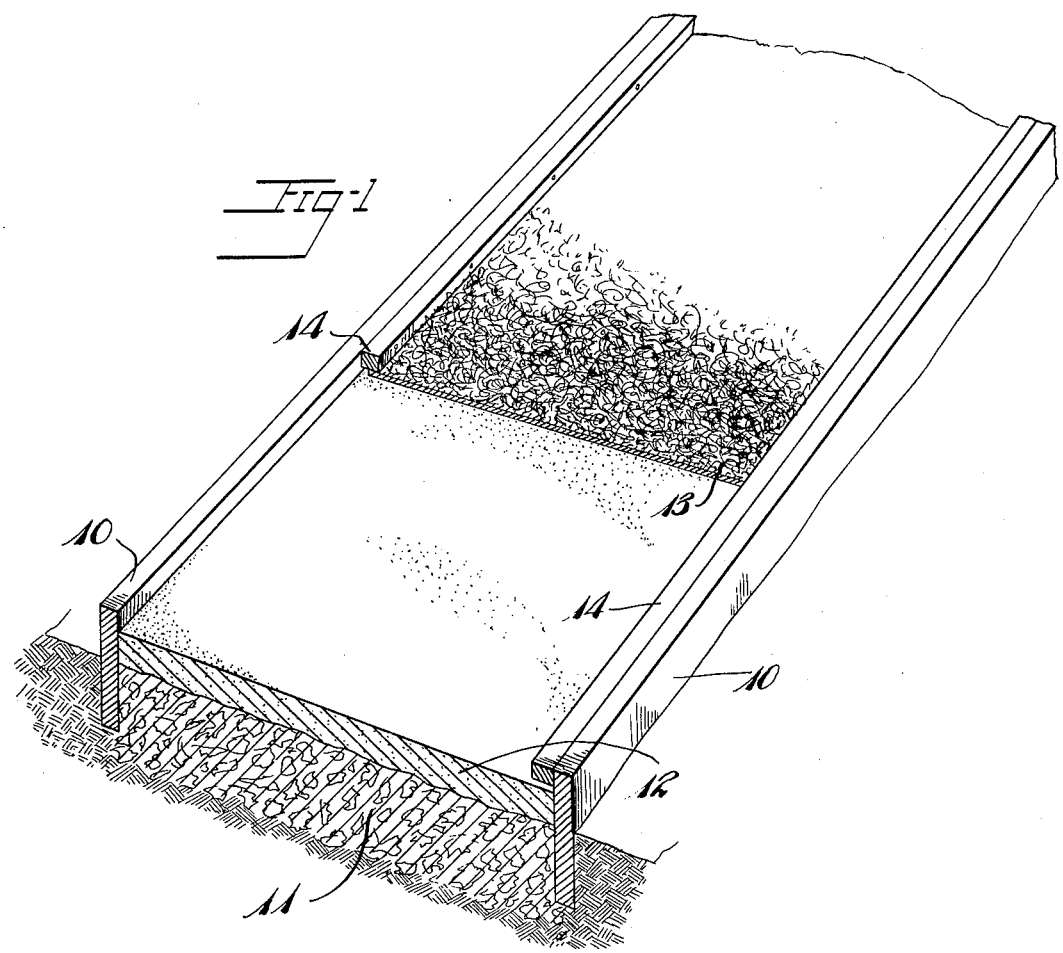
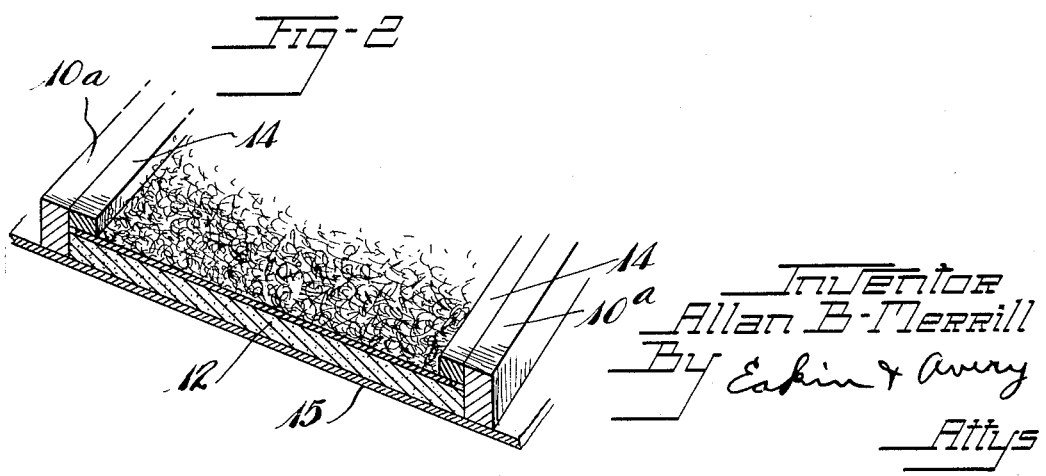
Inventor
Allan B. Merrill
By Eakin & Avery
Attys Patented Feb. 27, 1934

1,949,063

UNITED STATES PATENT OFFICE 1,949,063

ARTIFICIAL TURF

Allan B. Merrill, Akron, Ohio, assignor to The B. F. Goodrich Company, New York, N. Y., a corporation of New York Application August 14, 1930. Serial No. 475,150

1 Claim. (Cl. 94—7)

This invention relates to artificial turf such as may be used advantageously for miniature golf courses and the like, and the chief object of the invention is to provide artificial turf which closely simulates the mechanical characteristics as well as the appearance of natural turf. A more specific object is to provide artificial turf having the yielding springiness of natural turf.

Of the accompanying drawing:

Fig. 1 is a sectional perspective view of artificial turf embodying my invention, in its preferred form, in an outdoor installation.

Fig. 2 is a sectional perspective view of my invention in an indoor installation.

Referring to Fig. 1 of the drawing, 10, 10 are the side-rails of a rectangular frame-like structure of which the end-rails are not shown, the frame being sunk about half its thickness into the ground, and the latter being removed within the frame and replaced by cinders or similar porous material 11 which is firmly tamped in place to about the ground level. On top of the cinders 11 is a layer 12 consisting of a loose mass of comminuted material, and on top of the latter is a sheet of flexible material 13 which has its upper surface coated with fibrous or flaked material resembling grass. The margins of the sheet 13 are spaced from the side-rails 10 to permit lateral expansion of the sheet material without buckling, and cleats 14, 14 are secured to the side-rails 10 and overlie the margins of the sheet material 13 to secure the latter in place.

The sheet material 13 may consist of any of the known flexible sheet made in imitation of natural turf. Preferably it comprises a body structure comprising rubber, and a facing of unwoven fibrous material adhered to a surface thereof and dyed green.

The comminuted material 12 may consist of coarsely ground scrap rubber such, for example, as might be obtained from old tire casings, or it may consist of comminuted cork, but for the sake of economy I prefer to use sawdust. This provides a yielding backing for the sheet material 13 so that there is an underfoot springiness in the artificial turf which closely simulates the yielding character of natural turf. The sawdust does not cake or pack down and retains its springiness indefinitely.

In the indoor installation shown in Fig. 2 the side-rails 10ª, and end-rails (not shown) are secured to the floor 15, and the sawdust rests upon the floor, the cinders being dispensed with. In other respects the indoor installation is identical with the outdoor installation.

The invention may be modified within the scope of the appended claim, as I do not limit my claim wholly to the specific construction shown and described.

I claim:

Artificial turf comprising flexible sheet material in simulation of grass, a support therefor comprising loose sawdust, marginal confining means for the sawdust, and a layer of cinders beneath the sawdust.

ALLAN B. MERRILL.